United States Patent
Nakaide et al.

(10) Patent No.: US 11,829,266 B2
(45) Date of Patent: Nov. 28, 2023

(54) COMPUTING DEVICE, REDUNDANT SYSTEM, PROGRAM, AND METHOD FOR CONSTRUCTING REDUNDANT CONFIGURATION

(71) Applicant: MITSUBISHI HEAVY INDUSTRIES, LTD., Tokyo (JP)

(72) Inventors: Minoru Nakaide, Tokyo (JP); Shinichi Toda, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/642,017

(22) PCT Filed: Nov. 13, 2020

(86) PCT No.: PCT/JP2020/042417
§ 371 (c)(1),
(2) Date: Mar. 10, 2022

(87) PCT Pub. No.: WO2021/100624
PCT Pub. Date: May 27, 2021

(65) Prior Publication Data
US 2022/0350706 A1  Nov. 3, 2022

(30) Foreign Application Priority Data
Nov. 19, 2019 (JP) ................. 2019-208616

(51) Int. Cl.
*G06F 11/00* (2006.01)
*G06F 1/16* (2006.01)
(Continued)

(52) U.S. Cl.
CPC ........ *G06F 1/1658* (2013.01); *G06F 11/1438* (2013.01); *G06F 11/1471* (2013.01); *G06F 11/2038* (2013.01); *G06F 11/2097* (2013.01)

(58) Field of Classification Search
CPC ............. G06F 11/1471; G06F 11/1658; G06F 11/2038; G06F 11/2097
See application file for complete search history.

(56) References Cited

U.S. PATENT DOCUMENTS

2012/0331333 A1* 12/2012 Imaki .................. G06F 11/1658
714/E11.02
2014/0089447 A1 3/2014 Uchida et al.
(Continued)

FOREIGN PATENT DOCUMENTS

JP         9-128258        5/1997
JP      2012-208964       10/2012
(Continued)

OTHER PUBLICATIONS

International Search Report dated Feb. 9, 2021 in International Application No. PCT/JP2020/042417, with English-language translation.

(Continued)

*Primary Examiner* — Michael Maskulinski
(74) *Attorney, Agent, or Firm* — Wenderoth, Lind & Ponack, L.L.P.

(57) ABSTRACT

A computing device for configuring a redundant system includes: a detection unit configured to detect another computing device newly added to the redundant system during operation of the computing device; and a construction processing unit configured to execute construction processing for constructing a redundant configuration with the other computing device. The construction processing unit includes a first transmission unit for identifying construction start state information, and transmitting the construction start state information to the other computing device, and a second transmission unit for repeatedly performing identification of a change difference that arises in the state information as a result of computing processing of the computing device performed after identifying the construction start state information, from a time when the construction start state information was identified or a time when a previous timing was reached, and transmission of the change difference to the another computing device.

8 Claims, 5 Drawing Sheets

(51) Int. Cl.
   *G06F 11/14*   (2006.01)
   *G06F 11/20*   (2006.01)

(56) References Cited

U.S. PATENT DOCUMENTS

| | | |
|---|---|---|
| 2014/0281674 A1 | 9/2014 | Miyajima |
| 2015/0269037 A1 | 9/2015 | Ueda |
| 2016/0283251 A1 | 9/2016 | Enomoto et al. |
| 2021/0073089 A1* | 3/2021 | Sathavalli ........... G06F 9/45558 |

FOREIGN PATENT DOCUMENTS

| | | |
|---|---|---|
| JP | 5561334 | 7/2014 |
| JP | 5880608 | 3/2016 |
| JP | 2016-177716 | 10/2016 |
| JP | 6123388 | 5/2017 |
| JP | 2018-165915 | 10/2018 |
| JP | 2020-21341 | 2/2020 |

OTHER PUBLICATIONS

English translation of the International Preliminary Report on Patentability dated Jun. 2, 2022 in International Application No. PCT/JP2020/042417.

* cited by examiner

COMPUTING DEVICE, REDUNDANT SYSTEM, PROGRAM, AND METHOD FOR CONSTRUCTING REDUNDANT CONFIGURATION

TECHNICAL FIELD

The present disclosure relates to a redundant system and particularly relates to construction of a redundant configuration.

BACKGROUND

Conventionally, distributed control systems (DCS) have been used in power generation plants, railroad systems, ships, automotives, and factory automation to control their operations. A distributed control system is a system in which control devices are distributed and connected via a network to distribute functions. When high reliability and availability are required, the control devices are made to be redundant, for example, duplicated using two or more devices (hardware) having the same function (see Patent Document 1, for example).

If one of these redundant control devices fails, the failed control device is disconnected from the redundant configuration and recovered to be replaced with a new one or otherwise recovered. For example, Patent Document 2 discloses that, in a fault tolerant (Fr) server which duplicates information processing, before starting the duplication of information processing, full copy process is performed to copy all data stored in a memory of an operating subsystem to a memory of a newly added subsystem without stopping the information processing of the subsystem, and then data whose contents have been changed during this full copy process is copied in the same way after the information processing of the operating subsystem is stopped.

CITATION LIST

Patent Literature

Patent Document 1: JP2016-177716A
Patent Document 2: JP5880608B

SUMMARY

Problems to be Solved

However, in the case of a control device (redundant system) for a power generation plant, for example, even a momentary stoppage of control computation for a few tens or hundreds of milliseconds may cause a serious situation such as a power failure or accident. In Patent Document 2, the operating control device is temporarily stopped in order to copy a change difference that arises during the full copy process at the start of duplication process, which raises concerns about its application to the construction of a redundant configuration of computing devices such as control devices for power generation where stopping the computing processing is not acceptable.

In view of the above, an object of at least one embodiment of the present invention is to provide a computing device that can construct a redundant configuration with another computing device without stopping the computing processing of the device in operation.

Solution to the Problems

A computing device according to at least one embodiment of the present invention is for configuring a redundant system, and comprises: a detection unit configured to detect another computing device newly added to the redundant system during operation of the computing device; and a construction processing unit configured to execute construction processing for constructing a redundant configuration with the another computing device. The construction processing unit includes a first transmission unit for identifying construction start state information which is state information of the computing device required to construct the redundant configuration at the time of start of the construction processing, and transmitting the construction start state information to the another computing device, and a second transmission unit for repeatedly performing, each time a predefined timing is reached, until a predefined completion condition is satisfied, identification of a change difference that arises in the state information as a result of computing processing of the computing device performed after identifying the construction start state information, from a time when the construction start state information was identified or a time when a previous timing was reached, and transmission of the change difference to the another computing device.

A redundant system according to at least one embodiment of the present invention comprises: a primary server configured to run a first program on a virtual OS to cause a computer to execute a desired computing processing; and a secondary server redundant with the primary server and configured to run the first program on a virtual OS. The first program of each of the primary server and the secondary server is configured to work while keeping their states consistent with each other. Each of the primary server and the secondary server is configured to run a second program to cause a computer to implement a function of the computing device according to any one of claims 1 to 6.

A program according to at least one embodiment of the present invention is for causing a computer to implement: a detection unit configured to detect another computing device newly added to a redundant system during operation; and a construction processing unit configured to execute construction processing for constructing a redundant configuration with the another computing device. The construction processing unit includes a first transmission unit for identifying construction start state information which is state information of a primary computing device required to construct the redundant configuration at the time of start of the construction processing, and transmitting the construction start state information to the another computing device, and a second transmission unit for repeatedly performing, each time a predefined timing is reached, until a predefined completion condition is satisfied, identification of a change difference that arises in the state information as a result of computing processing of the primary computing device performed after identifying the construction start state information, from a time when the construction start state information was identified or a time when a previous timing was reached, and transmission of the change difference to the another computing device.

A method for constructing a redundant configuration according to at least one embodiment of the present invention comprises: a step of detecting another computing device newly added to a redundant system during operation; and a step of executing construction processing for constructing a redundant configuration with the another computing device. The step of executing the construction processing includes a step of identifying construction start state information which is state information of a primary computing device required to construct the redundant configuration at the time of start of the construction processing, and transmitting the construction start state information to the another computing device, and a step of repeatedly performing, each time a predefined timing is reached, until a predefined completion condition is satisfied, identification of a change difference that arises in the state information as a result of computing processing of the primary computing device performed after identifying the construction start state information, from a time when the construction start state information was identified or a time when a previous timing was reached, and transmission of the change difference to the another computing device.

Advantageous Effects

At least one embodiment of the present invention provides a computing device that can construct a redundant configuration with another computing device without stopping the computing processing of the active computing device.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction". "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
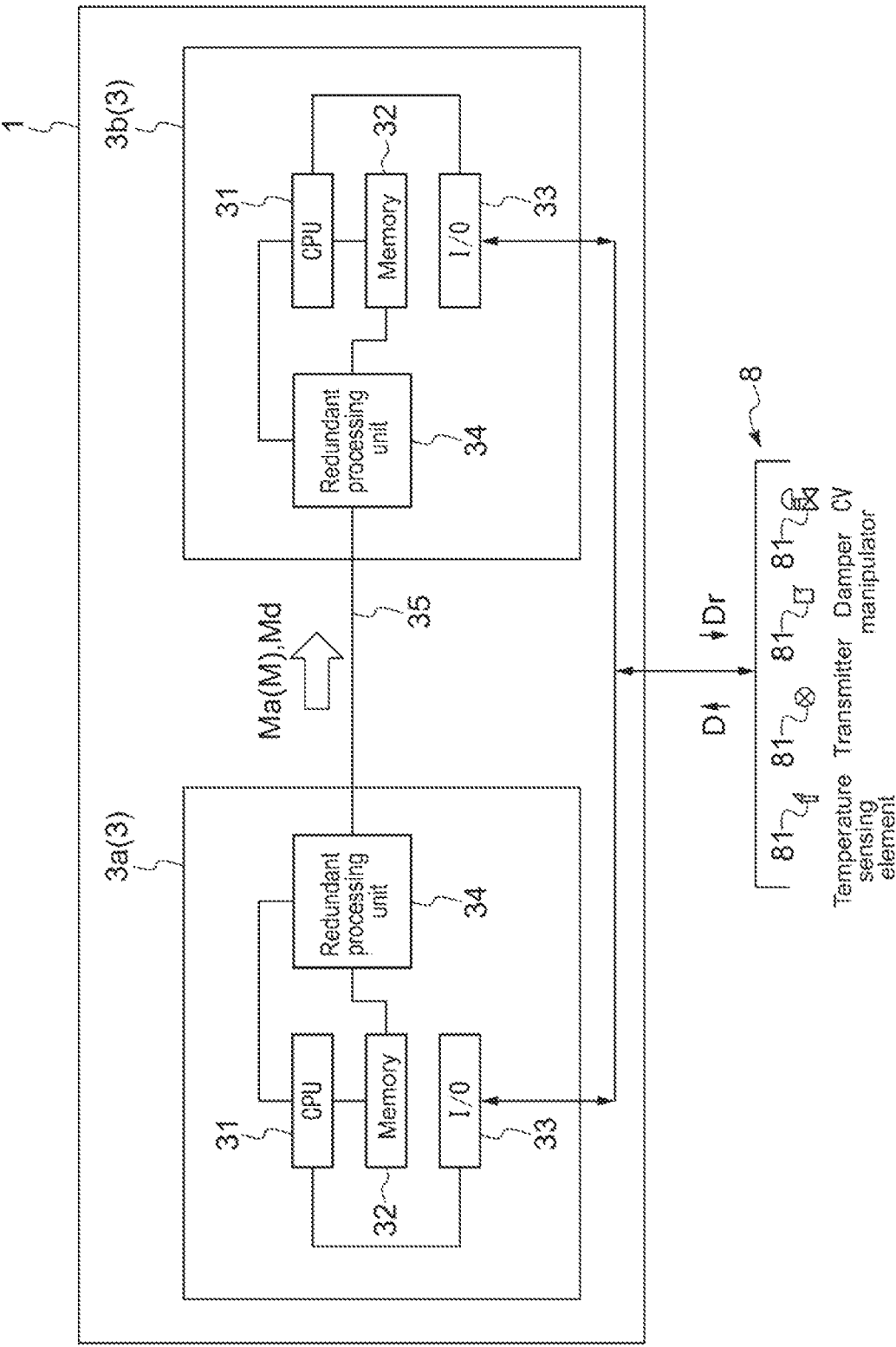
FIG. 1 is a schematic configuration diagram of a redundant system according to an embodiment of the present invention.

FIG. 1 is a schematic configuration diagram of a redundant system 1 according to an embodiment of the present invention.

As shown in FIG. 1, the redundant system 1 is a system (device) which operates with redundant processing using a plurality of redundant computing devices 3. Specifically, after constructing a redundant configuration, each of the plurality of computing devices 3 constituting the redundant system 1 continues to operate while keeping the contents of memories (state information M described below) consistent with each other, for example, by executing the same processing while synchronizing with data (input data D) input from the outside. Thus, even if one of the computing devices 3 fails, the computing processing can be continued by the other computing device 3, for example, by switching the standby system to the active system instead when a failure occurs in the presentactive system.

More specifically, as shown in FIG. 1, each computing device 3 (3a. 3b) is equipped with a processor 31 (CPU in FIG. 1) for performing computing processing, a memory 32 (main memory) such as RAM connected to the processor 31 via an internal bus or the like, an input/output interface unit 33 for input/output with the outside, and a redundant processing unit 34, which is a device composed of, for example, an FPGA for performing redundant processing with the other computing device 3. The redundant processing unit 34 is connected to the redundant processing unit 34 of the other computing device 3 via a communication line 35 to execute the redundant processing. Each computing device 3 is configured to be redundant with the other computing device 3 and execute various computations to be performed by the redundant system 1 through operation (e.g., data calculation) of the processor 31 according to instructions of a program loaded in the memory 32.

In the embodiment shown in FIG. 1, the redundant system 1 is a control system constituting a distributed control system (DCS) which performs control of a plant 8 such as a power generation plant, for example. This control device includes two CPU modules (controllers), each of which serves as the computing device 3, and is duplicated (redundant). The CPU module carries, for example, the overall computation function of the control device. Further, the redundant processing unit 34 executes construction processing for constructing a redundant configuration, which will be described later, and performs control computation (computing processing) after constructing the redundant configuration in synchronization with the other computing device 3 connected via the communication line 35 (the same shall apply hereinafter). The synchronous processing after the completion of the construction processing may be, but not limited to, a well-known method.

For example, synchronization may be performed by inputting to the standby computing device 3 via the communication line 35 the input data D that has been input to the active computing device 3. Alternatively, the same input data may be input to the plurality of computing devices 3, and information for synchronously executing the same instruction (computation) on the input data D may be exchanged through the communication line. The plurality of computing devices 3 may be operated according to the same clock to synchronously execute the same instruction (computation) on the input data D input to each. The output at this time may be output from the active computing device 3, or may be final output output from a majority decision circuit. Another way may be used.

Further, the redundant system 1 collects state data of the plant 8 such as event data and measurement data of temperature, flow rate, pressure, etc., measured by various measurement tools (field devices 81) installed on the plant 8, executes various computations using the collected one or more state data as the input data D to be processed, and transmits the computation result Dr to final control elements (field devices 81) such as a damper and a control valve (CV) to perform automatic control of the plant 8.

The control device (redundant system 1) of the plant 8 is usually connected to a LAN (Local Area Network) such as Ethernet (registered trademark) installed in the central operation room via a communication network (not shown) to enable communication with a computer device connected to the LAN, such as an operator station (OPS) that provides a function of operating and monitoring the plant 8. Further, the redundant system 1 can transmit the computation result Dr or the input data D to, for example, the OPS and receive operation commands from the OPS by using an interface unit (not shown) such as a LAN card for communication via a communication network (not shown), for example. The redundant system 1 may be a PLC (Programmable Logical Controller).

However, the present invention is not limited to the embodiment shown in FIG. 1. In some embodiments, the computing device 3 may not include the redundant processing unit 34. For example, the same input data D may be input to each of the computing devices 3 constituting the redundant system 1, and each may perform the same processing to operate without synchronization. In this case, construction processing described later may be performed using a network or the like through which the input data D flows.

In such a redundant system 1, for example, the computing device 3 that has failed is restarted or replaced. In the case of restart, the contents of the memory 32 is initialized. In the case of replacement, a new computing device 3 or repaired computing device 3 is connected to the active computing device 3. When such a recovery (addition) is performed, the memory of the computing device 3 newly added (connected) to the redundant system 1 is in the initialized state, and has different contents from the memory of the active computing device 3. Therefore, in order to start the redundant processing, it is necessary to construct a redundant configuration between the active computing device 3 and the newly added computing device 3.

At this time, if the redundant system 1 is a control device for a power generation plant, since even a momentary stoppage of control computation for a few tens or hundreds of milliseconds may cause a serious situation such as a power failure or accident, it is necessary to recover the redundant system 1 without stopping the control computation. To this end, the computing device 3 constructs the redundant configuration as described below before starting the redundant processing.

Hereinafter, the configuration for constructing the redundant configuration of the computing device 3 constituting the redundant system 1 will be described in detail with reference to FIGS. 2 and 3.

Figure 2:
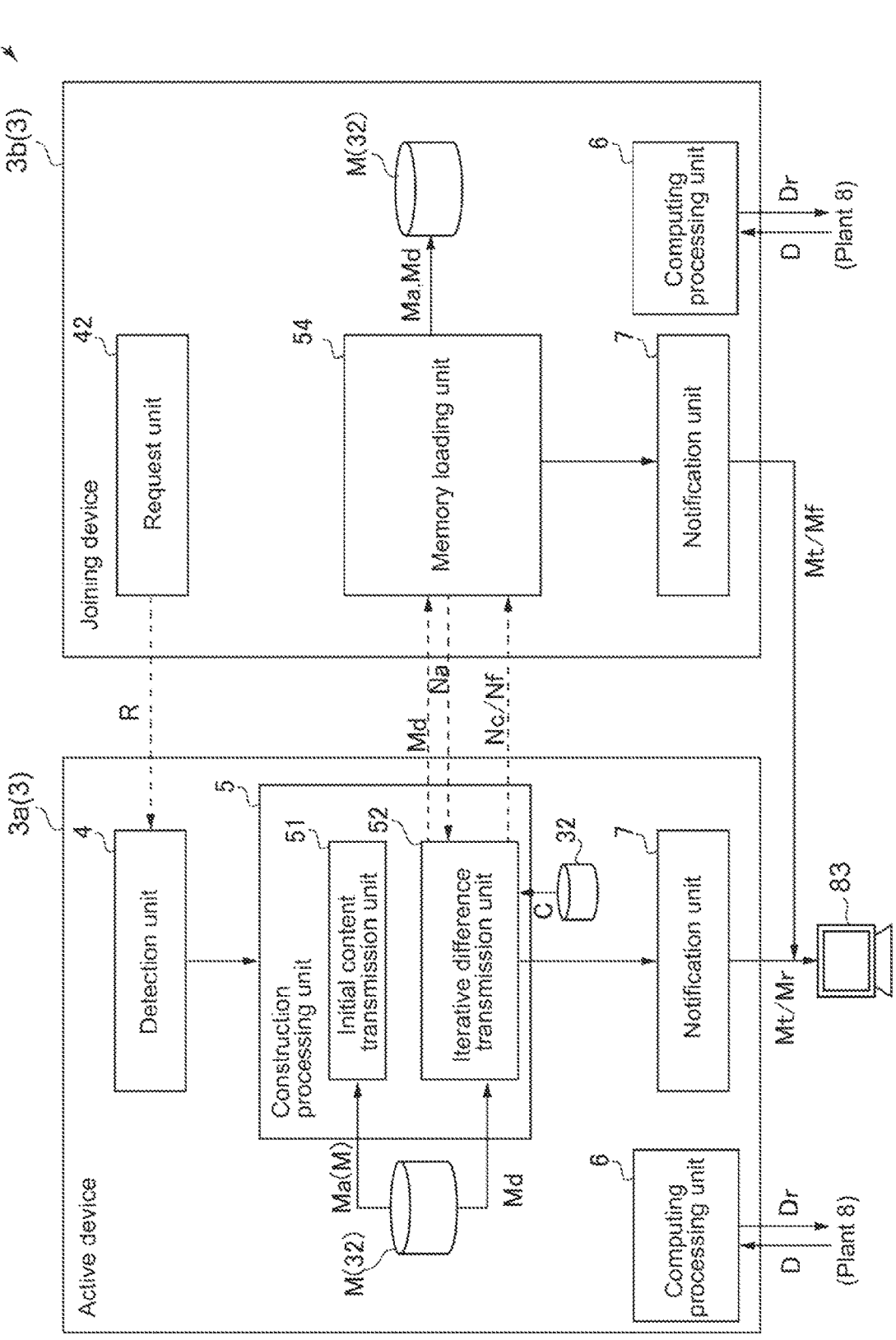
FIG. 2 is a block diagram of a computing device according to an embodiment of the present invention.

FIG. 2 is a block diagram of the computing device 3 according to an embodiment of the present invention. FIG. 3 is a configuration diagram of the redundant system 1 according to an embodiment of the present invention.

As shown in FIG. 2, the computing device 3 includes a detection unit 4 and a construction processing unit 5. These components (functional units) may be implemented by a program (redundancy construction program) executed by using the processor 31 and the memory 32 included in the computing device 3, or may be implemented by a logic circuit or a program executed by the redundant processing unit 34.

The following is an example of the case where the redundant configuration is constructed with the computing device 3 (hereinafter referred to as the "active device 3a") that is operating to perform control computation on a control target such as a final control element and another computing device 3 (hereinafter referred to as the "joining device 3b") that is newly added to the redundant system 1 and has the memory 32 in the initialized state while one of the computing devices 3 constituting the redundant system 1 is temporarily disconnected from the redundant system 1 due to a failure or other reason. That is, the case where the components of the computing device 3 is provided by the active device 3a will be described as an example although they can be provided by both the active device 3a and the joining device 3b. The computing device 3(3a, 3b) here is a hardware device such as a CPU module, or a task (process) running on a server such as an emulator (see FIG. 3) described later.

The detection unit 4 is a functional unit configured to detect another computing device 3 newly added to the redundant system 1 during its own computing device is active. For example, the detection unit 4 may perform the detection by receiving a request R via the communication line 35 from the joining device 3b connected to the communication line 35 (FIG. 1).

The construction processing unit 5 is a functional unit configured to execute construction processing for constructing a redundant configuration (for building redundancy) with the joining device 3b. In this construction processing, the active device 3a transmits to the joining device 3b its own state information M required to construct the redundant configuration so that the state information M of the two devices matches. The state information M is the contents (data) of the area in the memory 32 of the active device 3a where information that needs to be copied to the joining device 3b for constructing the redundant configuration is stored, and is data stored in at least a partial area of the memory 32. By this construction processing, the state information M of the active device 3a is copied to the memory 32 of the joining device 3b, so that the contents of the memories 32 of the two devices match to the necessary extent.

More specifically, the construction processing unit 5 has, as a component (functional unit) for executing the construction processing, an initial content transmission unit 51 (first transmission unit) for identifying construction start state information Ma which is the state information M at the time of start of the construction processing, and transmitting the construction start state information Ma to the joining device 3b, and an iterative difference transmission unit 52 (second transmission unit) for repeatedly performing, each time a predefined timing is reached, for example periodically, until a predefined completion condition C is satisfied, identification of a change difference Md that arises in the state information M and transmission of the change difference Md to the joining device 3b. The completion condition C is a condition for ending the construction processing, and the iterative difference transmission unit 52 ends the processing when it is determined that the completion condition C is satisfied.

In other words, even during the execution of the construction processing, the active device 3a does not stop the control computation the redundant system 1 needs to perform, but executes the control computation in a cycle of, for example, several tens of milliseconds. Further, the cycle of this control computation is shorter than the transmission time of the construction start state information Ma and the loading (reflection) to the joining device 3b. Therefore, the state information of the active device 3a may change due to the control computation of the active device 3a performed between the identification of the construction start state information Ma and the completion of the copying of the construction start state information Ma to the joining device 3b, so that the state information M (memory contents) of the two devices may differ at the completion of the copying.

Thus, the iterative difference transmission unit 52 identifies, each time the predefined timing is reached after the transmission of the construction start state information Ma, for example, the change difference Md from the time when the previous timing was reached, and transmits the identified change difference Md to the joining device 3b. This processing is repeated until the predefined completion condition C is satisfied. When the predefined timing is reached, at the beginning after the transmission of the construction start state information Ma, the difference (change difference Md) between the state information M of the active device 3a at that time and the construction start state information Ma is identified and transmitted.

The completion condition C may include one or more conditions. For example, it may include at least one of the following conditions. Specifically, the completion condition C may include a condition (first condition) determined based on the data size of the change difference Md. More specifically, the first condition may be that a ratio of the data size of the change difference Md to the data size of the construction start state information Ma is equal to or less than an arbitrary threshold. Alternatively, the first condition may be that the data size of the change difference Md is equal to or less than an arbitrary threshold. The completion condition C may include both of these first conditions. Thereby, it is possible to complete the construction processing when the change difference Md is, for example, a few percent.

Alternatively, the completion condition C may include a second condition that a processing elapsed time is equal to or more than a predefined time (predefined time). The processing elapsed time may be the time elapsed since the start of the construction process, after the identification of the construction start state information Ma, or after the start of processing by the iterative difference transmission unit 52. In other words, after the predefined time, for example, several minutes, tens of minutes, or hours, the state information M of the active device 3a and the joining device 3b is considered to match. Thus, even if the state information M of the active device 3a and the joining device 3b does not completely match, the construction processing can be completed successfully and proceed to the redundant processing.

Then, after the completion of the construction processing, the active device 3a and the joining device 3b perform the redundant processing. For example, if the construction processing is configured to be completed with the state information M of the joining device 3b and the active device 3a completely matched, by inputting the same input data D to each computing device 3, the control computation may be executed on the input data D synchronously (e.g., clock synchronization), or asynchronously by allowing a time lag in the processing of the input data D while making the state information M match.

Alternatively, if the construction processing is configured to be completed even with the state information M of the joining device 3b and the active device 3a not completely matched, after inputting the input data D that causes the mismatch to the joining device 3b, the redundant processing may be performed by allowing a time lag as described above. If the state information M completely matches, the control computation may be executed synchronously. Thus, the operation of the redundant system 1 is continued.

In the embodiment shown in FIG. 2, the construction processing unit 5 of the active device 3a is connected to the detection unit 4 and is configured to start the construction processing when the detection is input. Specifically, after the initial content transmission unit 51 transmits the construction start state information Ma to the joining device 3b, the iterative difference transmission unit 52 repeatedly identifies the change difference Md and transmits it to the joining device 3b. The iterative difference transmission unit 52 stops the processing when the completion condition C is satisfied.

The joining device 3b includes a request unit 42 for sending a request R for the construction of the redundant configuration, and a memory loading unit 54 for loading (copying) the construction start state information Ma or the change difference Md received from the active device 3a into its own state information M. The request R transmitted from the request unit 42 is received by the detection unit 4 of the active device 3a. Further, the memory loading unit 54 copies the construction start state information Ma and the change difference Md transmitted from the iterative difference transmission unit 52 of the active device 3a to an appropriate area of the memory 32 of the device.

Since each computing device 3 can serve as both the active device 3a and the joining device 3b, each has components (functional units) of both the active device 3a and the joining device 3b.

The active device 3a and the joining device 3b include a computing processing unit 6 configured to perform the control computation on the input data D. The computing processing unit 6 is configured to be able to acquire the input data D, execute the control computation, and output the computation result Dr without relation to, and independently of, the functional units related to the construction processing, such as the detection unit 4, the construction processing unit 5, the request unit 42, the memory loading unit 54, and a notification unit 7 (described later).

However, the present invention is not limited to the present embodiment. In other embodiments, the same input data D may not be input to each computing device 3 constituting the redundant system 1. For example, after the active computing device 3 performs the computing processing of the input data D, the change difference Md that arises in the state information M as a result of this processing may be transmitted to the standby computing device 3 via the communication line 35 to match the contents of the memories of the active and standby computing devices 3. The redundant system 1 may be configured such that all of the computing devices 3 operate in parallel as the active system and continue processing with the remaining computing device 3 in the event of a failure.

With the above configuration, upon detecting a new computing device 3 to construct the redundant configuration, the active computing device first transmits (copies) its own state information M (contents of the memory 32) to the new computing device 3. This allows the state information M of the two devices to match, but changes (change difference) in the state information M caused by the execution of computing processing by the active computing device until this match is made are repeatedly transmitted until the predefined completion condition C is satisfied to construct the redundant configuration.

As a result, the active computing device 3 can continue to perform its own computing processing without stopping even during the construction processing of the redundant configuration, while constructing the redundant configuration with the other newly added computing device 3. For example, in the case of a control device for a power generation plant, even a momentary stoppage of control computation for a few tens or hundreds of milliseconds may cause a serious situation such as a power failure or accident, but the above configuration enables construction of the redundant configuration without a momentary stoppage of control computation.

In some embodiments, as shown in FIG. 2, the computing device 3 may further include a notification unit 7 configured to issue notification (output of failure notification Nf) when the completion condition C is not satisfied within a time limit that is previously determined, for example. Further, the iterative difference transmission unit 52 stops the construction processing when the completion condition C is not satisfied within the time limit (in the case of no in S46c of FIG. 4, described below). The failure notification Nf may be notified to the joining device 3b or the administrator, for example.

In the embodiment shown in FIG. 2, the completion condition C includes the first condition but does not include the second condition. Under this completion condition C, the failure notification Nf is performed if the first condition is not satisfied within the time limit. Specifically, the notification unit 7 is connected to a display 83, such as an administration terminal, and outputs the failure notification Nf to the display 83. The failure notification Nf may be performed by sound. The administrator recognizes that the construction processing has been suspended by this failure notification Nf, and can change the timing of the construction of the redundant configuration, for example, when the power generation plant is operating at a constant output, to ensure the success of the construction of the redundant configuration.

With the above configuration, the construction processing of the redundant configuration is stopped when the completion condition C is not satisfied within the time limit, and the administrator or others are notified of this action. As a result, it is possible to prevent a situation in which a long time elapses without building redundancy on the joining side.

However, the present invention is not limited to the present embodiment. In other embodiments, the iterative difference transmission unit 52 may not stop the construction processing when the completion condition C is not satisfied within the time limit (in the case of yes in S46c of FIG. 4, described below). For example, if the redundant processing does not require a complete match of the state information M such as clock synchronization, operation may continue while ensuring that the state information M of the joining device 3b matches that of the active device 3a by continuing to identify, and transmit the change difference Md as the redundant processing. Whether to stop the construction processing of the redundant configuration may be automatically determined by settings, or may be determined according to instructions for stopping or continuing input by the administrator in response to the failure notification Nf.

Figure 3:
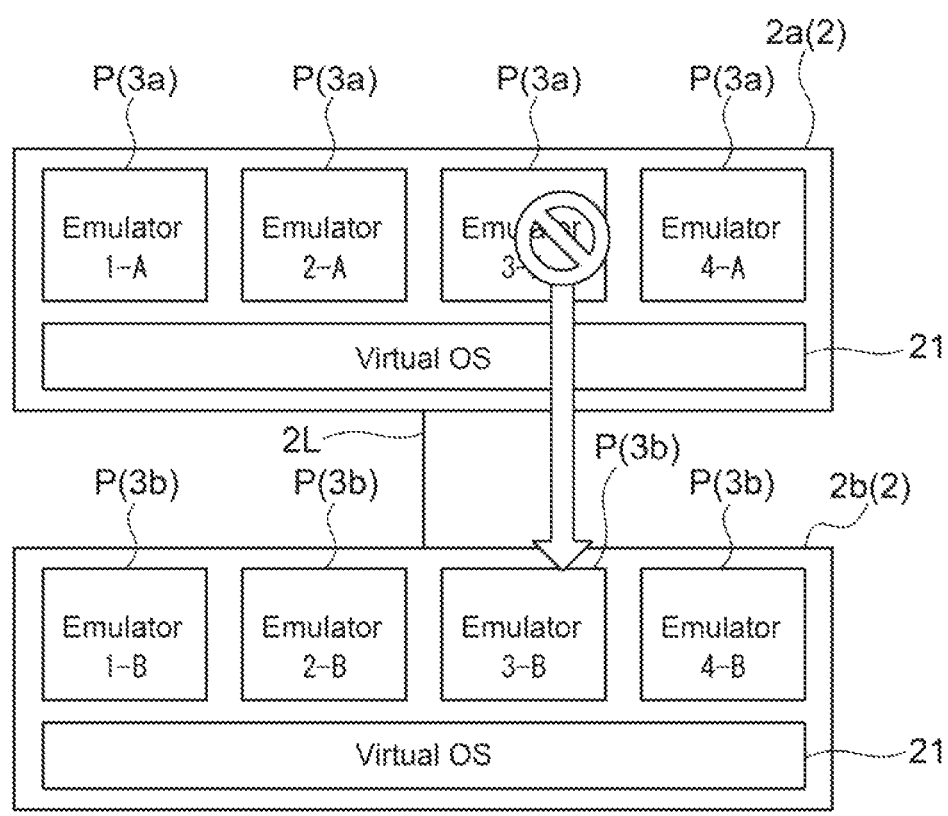
FIG. 3 is a configuration diagram of a redundant system according to an embodiment of the present invention.

Further, in some embodiments, as shown in FIG. 3, the redundant system 1 may be configured such that a program (control program) corresponding to the computing processing unit 6, running on virtual OSs 21 of a plurality of redundant (duplicated in FIG. 3) servers 2 (computers such as data servers), executes the redundant processing. That is, the virtual OS 21 may be installed on the server 2 such as a fault tolerant server (FT) server that can be stably supplied over a long term, and, for example, the control device of the DCS may be implemented as a software task (process).

Specifically, in some embodiments, the redundant system 1 includes a primary server 2a configured to run a first program (e.g., control program) on a virtual OS 21 to cause a computer to execute a desired computing processing, and a secondary server 2b redundant with the primary server 2a and configured to run the first program on a virtual OS 21. Further, the first program of each of the primary server 2a and the secondary server 2b is configured to work while keeping states consistent with each other. Additionally, each of the primary server 2a and the secondary server 2b is configured to run a second program (redundancy construction program) to cause the computer to implement a function of the computing device described above.

In the embodiment shown in FIG. 3, for example, a control program (emulator P) for implementing the same function as the control device that constitutes the DCS runs on the virtual OS 21 of each of the two duplicated servers 2. More specifically, in the DCS composed of multiple control devices, four emulators corresponding to four control devices run on the virtual OS 21 of each of the primary server 2a and the secondary server 2b which are duplicated. The emulator P includes the above-described control program, the redundant processing program for redundant processing, and the redundancy construction program. The corresponding emulators P of both servers 2 each continue to operate and execute control computation on the input data D from the plant 8, etc., while making the contents of the areas of the memory 32 of each server 2 allocated to the emulators P (state information M) match. Further, the redundancy construction program of the emulator P operates independently of the task of the control program, and the construction of the redundant configuration is performed by the redundancy construction program.

In FIG. 3, the primary server 2a is the active system (operating system), and the secondary server 2b is the standby system. It shows a situation where one (3-A) of the emulators on the primary server 2a has an abnormality due to, for example, a partial memory failure, so that it is switched to the corresponding emulator (3-B) on the secondary server (2b). Therefore, after that, the control device (3-B) of the standby system of the secondary server 2b operates to allow the DCS to continue the processing without stopping. A communication line 2L connecting the primary server 2a and the secondary server 2b in FIG. 3 may be a line that directly connects the two servers 2 to enable communication, or may be a communication network connected to the field devices 81 or OPS (already described).

However, the present invention is not limited to the present embodiment. For example, in the embodiment shown in FIG. 3, four emulators operate on one server 2, but the number of emulators may be any value of one or more. Further, for example, the emulator may be individually implemented by the control program while the redundant processing program and the redundancy construction program may operate as a common function. In other words, this common function may be provided in one separate device from the four emulators in FIG. 3. Thus, it is possible to process the state information M of all allocated areas of the four emulators at once, and it is possible to simplify the process. The same applies to the redundant processing.

With the above configuration, the primary server 2a and the secondary server 2b are redundant in hardware. Further, the first program for a desired computing processing, such as a function of the control device of the DC-S, running on the respective servers 2, works on the virtual OS 21 while keeping their states (contents of the allocated areas of the memory 32) consistent with each other. In other words, the redundant processing is performed between the first programs. Further, the second program for implementing each function (detection unit 4, construction processing unit 5, etc.)of the computing device 3 runs on the primary server 2*a* and the secondary server 2*b*.

That is, the virtual OS 21 is installed on the server 2 such as a FT server that can be stably supplied over a long term, and the control device of the DCS, for example, is implemented as a software task (process). Along with this, in such a redundant system, the second program for building the redundant configuration is operated. Thus, since the hardware is redundant using the high-performance server 2 that can be stably supplied over a long period of time, and hardware differences are absorbed using the virtual OS 21, it is possible to eliminate concerns such as the discontinuation of production of dedicated components in the conventional DCS, while ensuring that the first and second programs are not affected by changes in the hardware specifications of the server 2. In addition, if some of functions distributed as hardware are made to operate together on the server 2, the number of distributions in the DCS can be reduced, and the cost can be further reduced.

Hereinafter, the method for constructing the redundant configuration corresponding to the processing of the computing device 3 including the above configuration will be described with reference to FIGS. 4 and 5.

Figure 4:
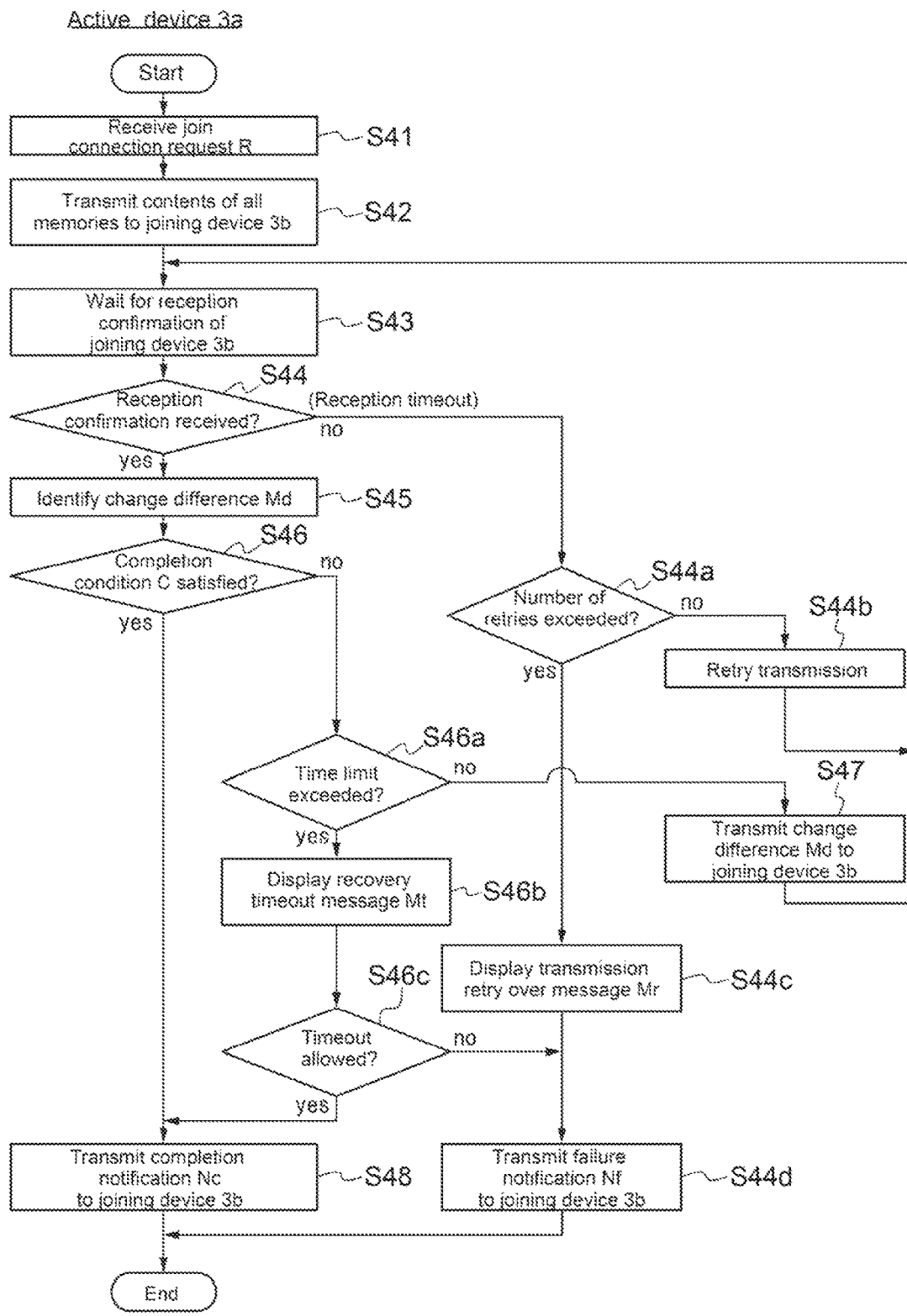
FIG. 4 is a diagram showing the method for constructing a redundant configuration according to an embodiment of the present invention and shows a flowchart corresponding to the processing of the active device.
Figure 5:
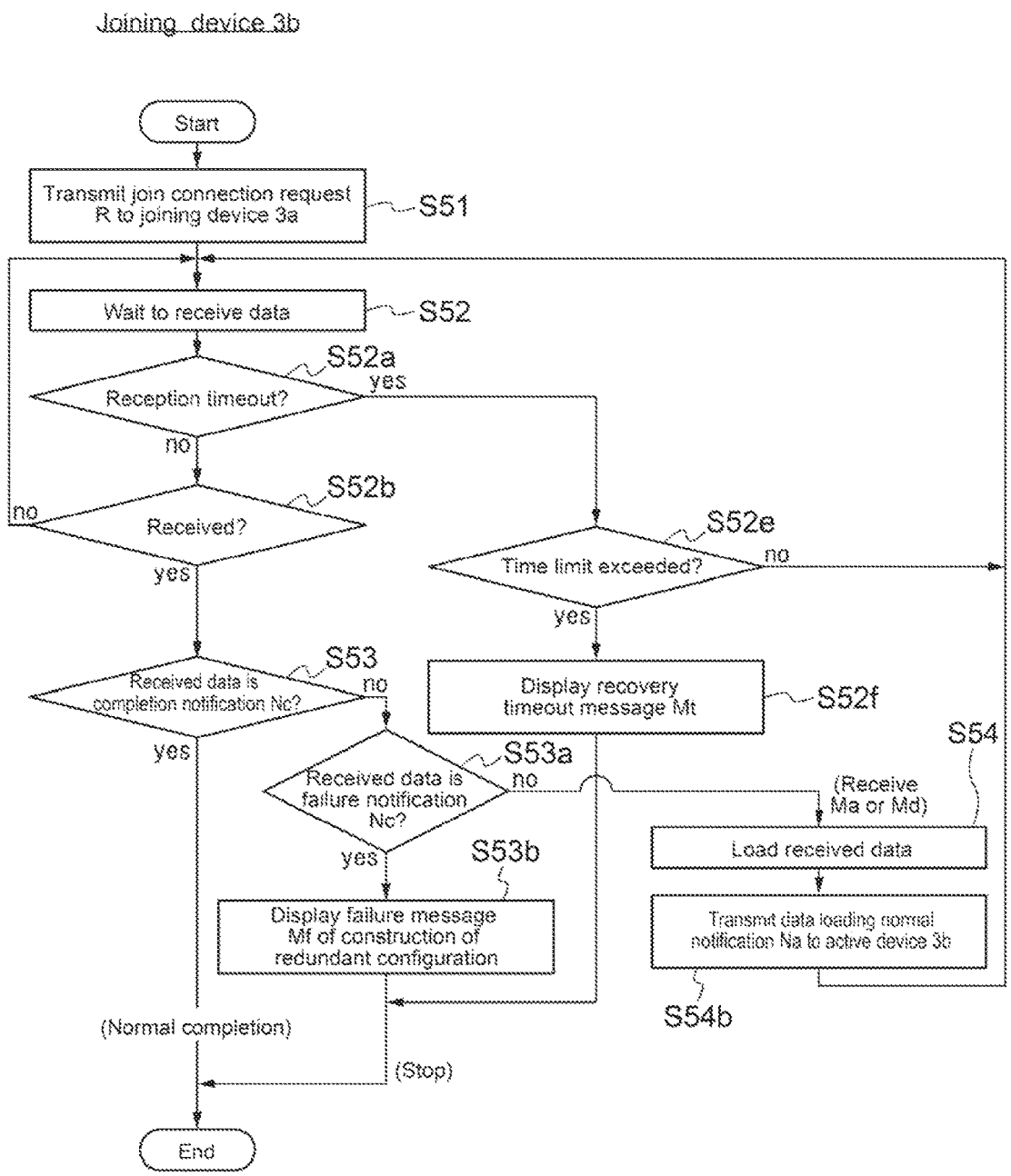
FIG. 5 is a diagram showing the method for constructing a redundant configuration according to an embodiment of the present invention and shows a flowchart corresponding to the processing of the joining device.

FIGS. 4 and 5 are diagrams showing the method for constructing the redundant configuration according to an embodiment of the present invention. FIG. 4 is a flowchart corresponding to the processing of the active device 3*a*. FIG. 5 is a flowchart corresponding to the processing of the joining device 3*b*.

As shown in FIG. 4, the method for constructing the redundant configuration includes a detection step (S41 of FIG. 4) of detecting another computing device 3 (the above-described joining device 3*b*) newly added to the redundant system 1 during operation, and a construction processing execution step (S42 to S48 of FIG. 4) of executing the above-described construction processing for constructing the redundant configuration with the joining device 3*b*. Specifically, the construction processing execution step includes a first transmission step (S42 of FIG. 4) of identifying the construction start state information Ma at the time of start of the construction processing, and transmitting the construction start state information Ma to the joining device 3*b*, and a second transmission step (S43 to S47 of FIG. 4) of repeatedly performing, each time a predefined timing is reached, until the predefined completion condition C is satisfied, identification of the change difference Md and transmission of the change difference Md to the joining device 3*b*, as described above.

The detection step and the construction processing execution step are the same as the process executed by the detection unit 4 and the construction processing unit 5 already described, so that the details will not be described again.

Further, in some embodiments, the method for constructing the redundant configuration may further include a notification step of issuing notification when the completion condition C is not satisfied within a time limit that is previously determined, for example. In this case, the second transmission step may stop the construction processing when the completion condition C is not satisfied within the time limit. The notification step is the same as the process executed by the notification unit 7, so that the details will not be described again.

In the embodiment shown in FIGS. 4 and 5, after the active device 3*a* and the joining device 3*b* connected via the communication line 35 (FIG. 2)or the communication line 2L (FIG. 3) get able to communicate with each other (e.g., after link-up), the active device 3*a* waits to receive a request R (join connection request) from the joining device 3*b*, and when the request R is received in step S41 of FIG. 4, transmits the construction start state information Ma (contents of all memory in this embodiment) to the joining device 3*b* in step S42. Then, in step S43, the device waits to receive a reception confirmation (data loading normal notification Na) for the data transmitted in step S42.

Then, upon receiving the reception confirmation in step S44, the change difference Md is identified in step S45. Further, it is checked whether the completion condition C is satisfied in step S46, and if not, the process proceeds to step S47 (via S46*a*) to transmit the identified change difference Md to the joining device 3*b*. When the transmission is completed, the process returns to step S43 and waits for a reception confirmation of the transmitted change difference Md from the joining device 3*b*. Such a loop through steps S45. S46. S47 and back to S43 is repeated until the completion condition C is satisfied in step S46.

A reception timeout may be set for waiting for the reception confirmation in step S43. In the embodiment shown in FIG. 4, when the reception timeout occurs, it is checked whether the number of retries exceeds a threshold in step S44*a*, and if not, the same data corresponding to the waiting reception confirmation is transmitted again in step S44*b*, and then the process returns to step S43 to wait for the reception confirmation. If the number of retries exceeds the threshold in step S44*a*, a message (transmission retry over message Mr) is displayed on a display or the like in step S44*c*. The failure may be notified to the joining device 3*b* as in step S44*d*.

In the case where the completion condition C is not satisfied in step S46, as shown in step S46*a* of FIG. 4, if the time limit is not exceeded as a result of check, the above-described step S47 may be executed. Conversely, if the time limit is exceeded in step S46*a*, a message (recovery timeout message Mt) may be displayed on a display 83 in step S46*b*. After that, the failure notification Nf may be transmitted to the joining device 3*b* as in step S44*d*, and the construction processing may be stopped after step S44*d*. Alternatively, as shown instep S46*c*, if the time limit is allowed to be exceeded, the construction processing of the redundant configuration may be completed through step S48, and move on the redundant processing, for example.

On the other hand, FIG. 5 shows the processing of the joining device 3*b* corresponding to FIG. 4 described above. Specifically, after transmitting the request R (join connection request) in step S51 of FIG. 5, the device waits to receive data (in this case, construction start state information Ma) from the active device 3*a* instep S52. Upon receiving the data transmitted from the active device 3*a* in step S52*b*, the process proceeds to step S53.

In step S53, if the received data in step S52*b* is not the completion notification Nc (see S48 in FIG. 4) but the construction start state information Ma, the received data (construction start state information Ma) is loaded (copied) to the memory 32 of the device in step S54 (via S53*a* in FIG. 5). When this step is completed, a reception confirmation (data loading normal notification Na) is transmitted to the active device 3a in step S54b, and then the process returns to step S52, and the device waits to receive the next data transmitted from the active device 3a. From this point onward (from the second loop onward), it is normally expected that the change difference Md will be transmitted from the active device 3a, and the device waits to receive the change difference Md. Then, when the change difference Md is received, after loading it to the memory 32 as described above (S54 and S54b), the process returns to step S52 repeatedly until the completion notification Nc is received in step S53.

Then, in step S53, if the data received in step S52b is the completion notification Nc, the process ends. In other words, since the construction of the redundant configuration with the active device 3a has been successfully completed, the device executes the redundant processing as the computing device 3 constituting the redundant system 1.

If the active device 3a does not allow the time limit to be exceeded (S46c and S44d in FIG. 4), the data received by the joining device 3b in step S52b of FIG. 5 may be the failure notification Nf. Accordingly, as shown in FIG. 5, it may be checked whether the received data is the failure notification Nf in step S53a, and if it is not the failure notification Nf, the process may move to step S54. In the embodiment shown in FIG. 5, if the received data is the failure notification Nf, a message (failure message Mf of construction of the redundant configuration) is displayed on the display 83 or the like in step S53b, and the construction processing of the redundant configuration with the active device 3a is stopped and terminated abnormally. The time limit may also be monitored at the joining device 3b. For example, the reception timeout for waiting for data reception (S52) may be monitored as shown in step S52a, and if the reception timeout occurs and the time limit is exceeded, the process may be terminated after displaying a message (recovery timeout message Mt) on the display 83 (SS2e, S52f).

The present invention is not limited to the embodiments described above, but includes modifications to the embodiments described above, and embodiments composed of combinations of those embodiments.

The flowcharts shown in FIGS. 4 and 5 are only illustrative. The invention is not limited to this embodiment, and the method for constructing a redundant configuration may be performed according to another flowchart.

<Appendix>

(1) A computing device (3) according to at least one embodiment of the present invention is a computing device (3) for configuring a redundant system (1), comprising: a detection unit (4) configured to detect another computing device (3) newly added to the redundant system (1) during operation of the computing device; and a construction processing unit (5) configured to execute construction processing for constructing a redundant configuration with the another computing device (3). The construction processing unit (5) includes a first transmission unit for identifying construction start state information (Ma) which is state information (M) of the computing device required to construct the redundant configuration at time of start of the construction processing, and transmitting the construction start state information (Ma)to the another computing device (3), and a second transmission unit for repeatedly performing, each time a predefined timing is reached, until a predefined completion condition (C) is satisfied, identification of a change difference (Md) that arises in the state information (M) as a result of computing processing of the computing device performed after identifying the construction start state information (Ma), from a time when the construction start state information (Ma) was identified or a time when a previous timing was reached, and transmission of the change difference (Md) to the another computing device (3).

With the above configuration (1), upon detecting a new computing device (3) to construct the redundant configuration, the active computing device (3) first transmits (copies) its own state information (M) (contents of the memory 32, the same shall apply hereinafter) to the new computing device (3). This allows the state information (M) of the two devices to match, but changes (change difference Md) in the state information (M) caused by the execution of computing processing by the active computing device until this match is made are repeatedly transmitted until the predefined completion condition (C) is satisfied to construct the redundant configuration.

As a result, the active computing device (3) can continue to perform its own computing processing (information processing such as control computation) without stopping even during the construction processing of the redundant configuration, while constructing the redundant configuration with the other newly added computing device (3). For example, in the case of a control device for a power generation plant (8), even a momentary stoppage of control computation for a few tens or hundreds of milliseconds can cause a serious situation such as a power failure or accident, but the above configuration enables construction of the redundant configuration without a momentary stoppage of computing processing (control computation).

(2) In some embodiments, in the above configuration (1), the computing device further comprises a computing processing unit (6) configured to perform the computing processing on input data (D) input to the redundant system (1) regardless of whether the construction processing is executed.

With the above configuration (2), the active computing device (3) continues to operate without stopping its own computing processing in the active state even during the execution of the construction processing of the redundant configuration.

(3) In some embodiments, in any one of the above configurations (1) to (2), the completion condition (C) includes a first condition (Ca) determined based on a data size of the change difference (Md).

With the above configuration (3), the construction processing of the redundant configuration includes a condition determined based on the data size of the change difference (Md), for example, the data size of the change difference (Md) being equal to or less than a predetermined threshold, or the ratio of the data size of the change difference (Md) to the data size of the construction start state information (Ma) being equal to or less than a predetermined threshold. This allows the state information (M) of the computing computer (3) and the other computing device (3) to match appropriately to the extent required for the type of redundant processing to be performed by each computing device (3) after the completion of the construction processing of the redundant configuration, for example, redundant operation with fully synchronized clocks or redundant operation with some differences allowed.

(4) In some embodiments, in the above configuration (3), the first condition (Ca) is that a ratio of the data size of the change difference (Md) to a data size of the construction start state information (Ma) is equal to or less than a threshold.

With the above configuration (4), the construction processing of the redundant configuration is completed when the data size of the change difference (Md) relative to the data size of the construction start state information (Ma) is equal to or less than a first threshold. This allows the state information (M) of the computing computer (3) and the other computing device (3) to match appropriately to the extent required for the type of redundant processing to be performed by each computing device (3) after the completion of the construction processing of the redundant configuration.

(5) In some embodiments, in any one of the above configurations (1) to (4), the completion condition (C) includes a second condition (Cb) defining that a processing elapsed time is equal to or more than a predefined time.

With the above configuration (5), the construction processing of the redundant configuration is completed when, for example, the processing elapsed time such as the elapsed time of the construction processing of the redundant configuration or the elapsed time of the processing of the second transmission unit exceeds the predefined time. In other words, for example, after the predefined time has elapsed, the state information (M) of the computing device (3) and the other computing device (3) is considered to match. Thus, even if the state information (M) of the two devices does not completely match, the construction processing can be completed successfully and proceed to the redundant processing.

(6) In some embodiments, in any one of the above configurations (1) to (5), the computing device further comprises a notification unit (7) configured to issue notification when the completion condition (C) is not satisfied within a time limit. The second transmission unit stops the construction processing when the completion condition (C) is not satisfied within the time limit.

With the above configuration (6), the construction processing of the redundant configuration is stopped when the completion condition (C) is not satisfied within the time limit, and the administrator or others are notified of this action. As a result, it is possible to prevent a situation in which a long time elapses without building redundancy on the joining side.

(7) A redundant system (1) according to at least one embodiment of the present invention comprises: a primary server (2a) configured to run a first program (for example, control program in the emulator P of FIG. 3, the same shall apply hereinafter) on a virtual OS (21) to cause a computer to execute a desired computing processing; and a secondary server (2b) redundant with the primary server (2a) and configured to run the first program (P) on a virtual OS (21). The first program (P) of each of the primary server (2a) and the secondary server (2b) is configured to work while keeping states consistent with each other. Each of the primary server (2a) and the secondary server (2b) is configured to run a second program (redundancy construction program in the emulator P of FIG. 3) to cause a computer to implement a function of the computing device (3) described in any one of the above (i) to (6).

With the above configuration (7), the primary server (2a) and the secondary server (2b) are redundant in hardware. Further, the first program (P) for a desired computing processing, such as a function of the control device of the DCS, running on the respective servers (2), works on the virtual OS (21) while keeping their states (contents of the allocated areas of the memory (32)) consistent with each other. In other words, the redundant processing is performed between the first programs (P). Further, the second program for implementing each function (detection unit 4, construction processing unit 5, etc.) of the computing device (3) runs on the primary server (2a) and the secondary server (2b).

That is, the virtual OS (21) is installed on the server (2) such as a FT server (2) that can be stably supplied over a long term, and the control device of the DCS, for example, is implemented as a software task (process). Along with this, in such a redundant system (1), the second program for building the redundant configuration is operated.

Here, the current DCS has a configuration in which the controller (CPU module) is distributed across multiple control cabinets, which keeps the cost high. There are also concerns about the long-term stable supply of distributed control systems, as dedicated electronic components installed in the controller are discontinued, such as EOL (End of Life). However, with the above configuration, since the hardware is redundant using the high-performance server (2) that can be stably supplied over a long term, and hardware differences are absorbed using the virtual OS (21), it is possible to eliminate concerns such as the discontinuation of production of dedicated components in the conventional DCS, while ensuring that the first program (P) and the second program are not affected by changes in the hardware specifications of the server (2). In addition, if some of functions distributed as hardware are made to operate together on the server (2), the number of distributions in the DCS can be reduced, and the cost can be further reduced.

(8) A program according to at least one embodiment of the present invention is for causing a computer to implement: a detection unit (4) configured to detect another computing device (3) newly added to a redundant system (1) during operation; and a construction processing unit (5) configured to execute construction processing for constructing a redundant configuration with the another computing device (3). The construction processing unit (5) includes a first transmission unit for identifying construction start state information (Ma) which is state information (M) of a primary computing device required to construct the redundant configuration at time of start of the construction processing, and transmitting the construction start state information (Ma) to the another computing device (3), and a second transmission unit for repeatedly performing, each time a predefined timing is reached, until a predefined completion condition (C) is satisfied, identification of a change difference (Md) that arises in the state information (M) as a result of computing processing of the primary computing device performed after identifying the construction start state information (Ma), from a time when the construction start state information (Md) was identified or a time when a previous timing was reached, and transmission of the change difference (Md) to the another computing device (3).

With the above configuration (8), the same effect is achieved as in the above (1).

(9) A method for constructing a redundant configuration according to at least one embodiment of the present invention comprises: a step of detecting another computing device (3) newly added to a redundant system (1) during operation; and a step of executing construction processing for constructing a redundant configuration with the another computing device (3). The step of executing the construction processing includes a step of identifying construction start state information (Ma) which is state information (M) of a primary computing device required to construct the redundant configuration at time of start of the construction processing, and transmitting the construction start state information (Ma) to the another computing device (3), and a step of repeatedly performing, each time a predefined timing is reached, until a predefined completion condition (C) is satisfied, identification of a change difference (Md) that arises in the state information (M) as a result of computing processing of the primary computing device performed after identifying the construction start state information (Ma), from a time when the construction start state information (Ma) was identified or a time when a previous timing was reached, and transmission of the change difference (Md) to the another computing device (3).

With the above configuration (9), the same effect is achieved as in the above (1).

REFERENCE SIGNS LIST

1 Redundant system
2 Server
2a Primary server
2b Secondary server
2L Communication line
21 Virtual OS
3 Computing device
3a Active device
3b Joining device
31 Processor
32 Memory
33 Input/output interface unit
34 Redundant processing unit
35 Communication line
4 Detection unit
42 Request unit
Construction processing unit
51 Initial content transmission unit
52 Iterative difference transmission unit
54 Memory loading unit
6 Computing processing unit
7 Notification unit
8 Plant
81 Field device
83 Display
D input data
Dr Computation result
R Request
C Completion condition
Ca First condition
Cb Second condition
M State information
Ma Construction start state information
Md Change difference
Na Data loading normal notification (reception confirmation)
Nc Completion notification
Nf Failure notification
Mr Transmission retry over message
Mt Recovery timeout message
Mf Failure message of construction of redundant configuration
P Emulator

The invention claimed is:

1. A computing device for configuring a redundant system, comprising:
a memory configured to store a program; and
a processor configured to execute the program and control the computing device to:
detect another computing device newly added to the redundant system during operation of the computing device; and
execute construction processing for constructing a redundant configuration with the another computing device,
wherein the construction processing includes
identifying construction start state information which is state information of the computing device required to construct the redundant configuration at time of start of the construction processing, and transmitting the construction start state information to the another computing device, and
repeatedly performing, each time a predefined timing is reached, until a predefined completion condition for ending the construction processing is satisfied, identification of a change difference that arises in the state information as a result of computing processing of the computing device performed after identifying the construction start state information, from a time when the construction start state information was identified or a time when a previous timing was reached, and transmission of the change difference to the another computing device,
wherein the completion condition includes a first condition determined based on a data size of the change difference.

2. The computing device according to claim 1, wherein the processor is further configured to execute the program and control the computing device to perform the computing processing on input data input to the redundant system regardless of whether the construction processing is executed.

3. A redundant system, comprising:
a primary server configured to run a first program on a virtual OS to cause a computer to execute a desired computing processing; and
a secondary server redundant with the primary server and configured to run the first program on a virtual OS,
wherein the first program of each of the primary server and the secondary server is configured to work while keeping states consistent with each other, and
wherein each of the primary server and the secondary server is configured to run a second program to cause a computer to implement a function of the computing device according to claim 1.

4. A computing device for configuring a redundant system, comprising:
a memory configured to store a program; and
a processor configured to execute the program and control the computing device to:
detect another computing device newly added to the redundant system during operation of the computing device; and
execute construction processing for constructing a redundant configuration with the another computing device,
wherein the construction processing includes
identifying construction start state information which is state information of the computing device required to construct the redundant configuration at time of start of the construction processing, and transmitting the construction start state information to the another computing device, and
repeatedly performing, each time a predefined timing is reached, until a predefined completion condition is satisfied, identification of a change difference that arises in the state information as a result of computing processing of the computing device performed after identifying the construction start state information, from a time when the construction start state information was identified or a time when a previous timing was reached, and transmission of the change difference to the another computing device, wherein the completion condition includes a first condition determined based on a data size of the change difference, and wherein the first condition is that a ratio of the data size of the change difference to a data size of the construction start state information is equal to or less than a threshold.

5. A computing device for configuring a redundant system, comprising:

a memory configured to store a program; and a processor configured to execute the program and control the computing device to:

detect another computing device newly added to the redundant system during operation of the computing device; and execute construction processing for constructing a redundant configuration with the another computing device, wherein the construction processing includes identifying construction start state information which is state information of the computing device required to construct the redundant configuration at time of start of the construction processing, and transmitting the construction start state information to the another computing device, and repeatedly performing, each time a predefined timing is reached, until a predefined completion condition for ending the construction processing is satisfied, identification of a change difference that arises in the state information as a result of computing processing of the computing device performed after identifying the construction start state information, from a time when the construction start state information was identified or a time when a previous timing was reached, and transmission of the change difference to the another computing device, wherein the completion condition includes a second condition defining that a processing elapsed time is equal to or more than a predefined time.

6. A computing device for configuring a redundant system, comprising:

a memory configured to store a program; and a processor configured to execute the program and control the computing device to:

detect another computing device newly added to the redundant system during operation of the computing device; and execute construction processing for constructing a redundant configuration with the another computing device, wherein the construction processing includes identifying construction start state information which is state information of the computing device required to construct the redundant configuration at time of start of the construction processing, and transmitting the construction start state information to the another computing device, and repeatedly performing, each time a predefined timing is reached, until a predefined completion condition is satisfied, identification of a change difference that arises in the state information as a result of computing processing of the computing device performed after identifying the construction start state information, from a time when the construction start state information was identified or a time when a previous timing was reached, and transmission of the change difference to the another computing device, wherein the processor is further configured to execute the program and control the computing device to issue notification when the completion condition is not satisfied within a time limit, and to stop the construction processing when the completion condition is not satisfied within the time limit.

7. A non-transitory computer readable medium storing a program that causes a processor of a computer to execute:

detecting another computing device newly added to a redundant system during operation; and construction processing for constructing a redundant configuration with the another computing device, wherein the construction processing includes identifying construction start state information which is state information of a primary computing device required to construct the redundant configuration at time of start of the construction processing, and transmitting the construction start state information to the another computing device, and repeatedly performing, each time a predefined timing is reached, until a predefined completion condition for ending the construction processing is satisfied, identification of a change difference that arises in the state information as a result of computing processing of the primary computing device performed after identifying the construction start state information, from a time when the construction start state information was identified or a time when a previous timing was reached, and transmission of the change difference to the another computing device, wherein the completion condition includes a first condition determined based on a data size of the change difference.

8. A method performed by a computer including a memory storing a program and a processor for constructing a redundant configuration, the processor executing the program to perform operations of the method comprising:

detecting another computing device newly added to a redundant system during operation; and executing construction processing for constructing a redundant configuration with the another computing device, wherein the executing the construction processing includes identifying construction start state information which is state information of a primary computing device required to construct the redundant configuration at time of start of the construction processing, and transmitting the construction start state information to the another computing device, and repeatedly performing, each time a predefined timing is reached, until a predefined completion condition for ending the construction processing is satisfied, identification of a change difference that arises in the state information as a result of computing processing of the primary computing device performed after identifying the construction start state information, from a time when the construction start state information was identified or a time when a previous timing was reached, and transmission of the change difference to the another computing device, wherein the completion condition includes a first condition determined based on a data size of the change difference.

* * * * *